United States

Mochida et al.

4,074,127

Feb. 14, 1978

[54] OPTICAL PCM GROUP TRANSMISSION REPEATING SYSTEM

[75] Inventors: Yukou Mochida; Tadao Ogawa, both of Kawasaki; Kazuo Yamaguchi, Hiratsuka, all of Japan

[73] Assignee: Fujitsu Limited, Kawasaki, Japan

[21] Appl. No.: 717,273

[22] Filed: Aug. 24, 1976

[30] Foreign Application Priority Data

Aug. 26, 1975  Japan .................. 50-102524

[51] Int. Cl.² ............................................. H04B 9/00
[52] U.S. Cl. ..................................................... 250/199
[58] Field of Search ......................................... 250/199

[56] References Cited

U.S. PATENT DOCUMENTS

| 3,727,061 | 4/1973 | Dworkin | 250/199 |
| 3,801,819 | 4/1974 | Ohnsorge | 250/199 |
| 3,851,167 | 11/1974 | Levine | 250/199 |

*Primary Examiner*—Richard Murray
*Attorney, Agent, or Firm*—Staas & Halsey

[57] ABSTRACT

An optical fiber communication system using group transmission which transmits PCM information by utilizing an optical fiber group composed of a plurality of optical fibers. The PCM information in a plurality of optical fibers is stored in a memory of the system's sending terminal, the stored information of each system is read out by simultaneous clock pulses so as to send out the information to a transmission line which is composed of a plurality of said optical fibers. A repeater is provided in the transmission line having at least one of the following circuits, an AGC circuit, a light element control circuit, a power supply circuit and a supervisory circuit. The supervisory circuit is commonly provided for checking a plurality of signals which is transmitted by the above-mentioned optical fibers. In the repeater, the signals are regenerated by simultaneous clock pulses which are generated from one common timing circuit, and the phases of the signals are arranged in order for sending out said signals to the transmission line composed of said optical fibers.

12 Claims, 18 Drawing Figures

OPTICAL PCM GROUP TRANSMISSION REPEATING SYSTEM

BACKGROUND OF THE INVENTION

1. Field of the Invention

The present invention relates to a repeating system in an optical pulse code modulation group transmission system using optical fibers.

2. Description of the Prior Art

In conventional high speed PCM transmission systems a sending terminal sends out an input signal information by using a code representing a combination of the presences or absences of pulses, a receiving terminal is provided for regenerating the original information by discriminating the code, and copper cables are used for the transmission lines. This is due to the reason that digital signals should be transmitted with high quality. When transmission is carried out over long distance line 5, repeaters are used per every cable so as to compensate for the current loss in the cable or for equalizing the transmitted signal.

In the above-mentioned PCM transmission system using copper cables, one repeater is required per every one cable, therefore, a group transmission repeating system, wherein the signals transmitted by a plurality of cables are repeated by one single repeater, is not realized.

SUMMARY OF THE INVENTION

Recently, the technique of utilizing optical fibers has been considerably developed, and a PCM transmission system using the optical fiber technique is herein disclosed. The diameter of each optical fiber is, for example, about 1 mm, this diameter being considerably smaller than that of a copper cable which is about 1 cm. Further, low costs can be expected with respect to the employing of optical fibers. This is the reason why a space division multi-transmission system using optical fiber groups has been proposed. When optical fiber groups are applied to the space division multi-transmission system, a group of signals can be repeated by one repeater. Because, as the diameter of the optical fiber is considerably small, the repeater can be realized with small dimensions for the group of signals to be transmitted.

An object of the present invention is to provide a simple, small size and low cost repeating system within an optical pulse code modulation group transmission system using optical fibers.

A further object of this invention is to provide a system for transmitting PCM information by means of a plurality of optical fiber groups each of which has a plurality of optical fibers therein, and group repeaters being provided for each fiber group with each repeater having a plurality of individual means for regenerating the PCM information as transmitted through a plurality of the optical fibers, and each group repeater also having additional means commonly connected to the individual means for the simultaneous control thereof.

For achieving the above-mentioned objects, the characteristic features of the present invention concern applying a repeating system to an optical fiber communication system using group transmission which transmits PCM information by utilizing an optical fiber group composed of a plurality of optical fibers. According to the present invention, PCM information in an optical fiber communication system is stored in a memory of a sending terminal, stored information is read out by simultaneous clock pulses so as to send out said information to a transmission line which is composed of a plurality of the optical fibers. In a repeater provided in the transmission line, at least one of the following circuits is commonly provided; an AGC circuit, a light element control circuit, a power supply circuit or a supervisory circuit for checking a plurality of signals which is transmitted by the above-mentioned optical fibers. In the repeater, the signals are reproduced simultaneously in accord with clock pulses which are generated from one timing circuit and the phases of the signals are arranged in order for sending out said signals to the transmission line composed of said optical fibers.

Further features and advantages of the present invention will be apparent from the ensuing description, with reference to the accompanying drawings, to which, however, the scope of the invention is no way limited.

BRIEF DESCRIPTION OF THE DRAWINGS

FIG. 6 (FIG. 6A and FIG. 6B) is a time chart of the signals which flow in the group repeater shown in FIG. 5;

DESCRIPTION OF THE PREFERRED EMBODIMENT

Figure 1:
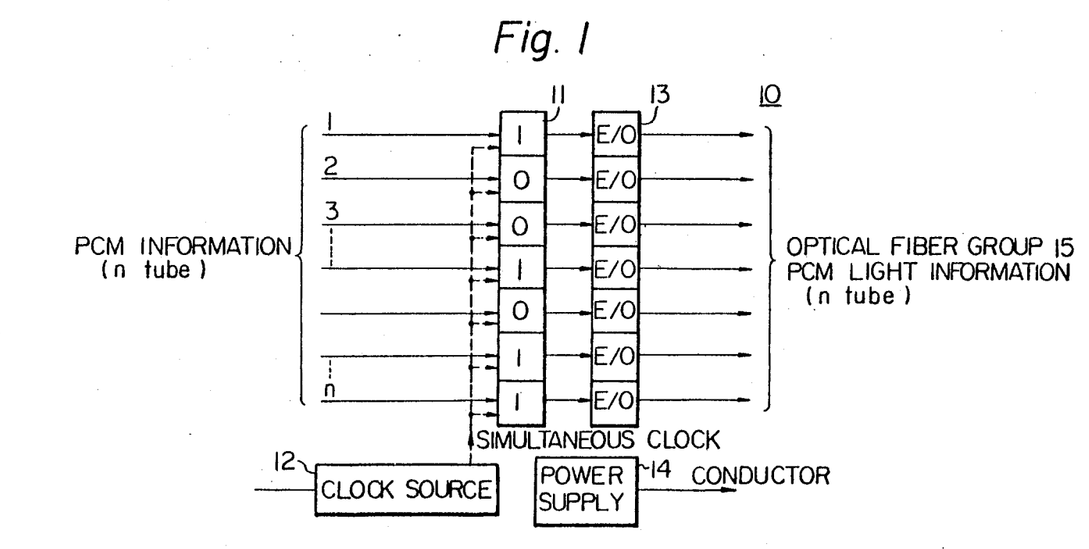
FIG. 1 is a block diagram of a sending terminal of the optical PCM group transmission system according to the present invention.
Figure 2:
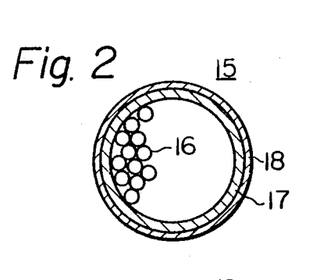
FIG. 2 is a cross-section of an optical fiber group cable which is used in the system according to the present invention.

Referring to FIG. 1, "n" pieces of PCM information, which are time division multiplexed, are stored in parallel via n inputs in a memory 11. Phases of the stored information are arranged by simultaneous clock pulses which are generated in a clock source 12. The information is converted into a plurality of optical outputs by an electro-optic converter 13 for sending out said outputs to an optical fiber group 15. The optical fiber group 15 used in the present invention is shown in detail in FIG. 2. As shown in FIG. 2, the optical fiber group or light cable 15 is composed of a group of optical fibers 16, a conductor 17 and a sheath 18. Power from a power source 14 (FIG. 1) is supplied via the conductor 17 to a group repeater (shown in FIG. 5).

Figure 3:
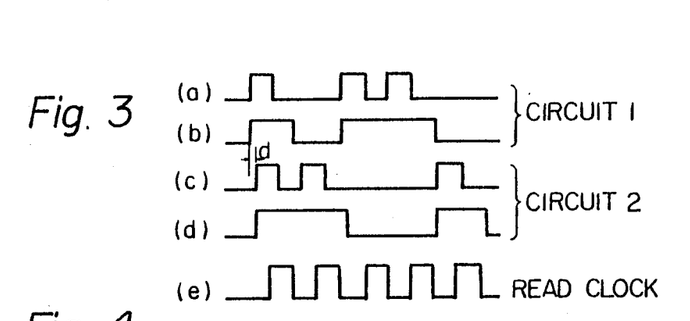
FIG. 3 is a timing chart of the input information of the sending terminal shown in FIG. 1.

FIG. 3 shows a time chart of the input information of the sending terminal shown in FIG. 1; (a) of FIG. 3 is PCM information in the first input 1 of FIG. 1; (b) of FIG. 3 is a waveform of information (a) written in the memory 11 (FIG. 1); (c) of FIG. 3 is PCM information in the second input 2 of FIG. 1 and; (d) of FIG. 3 is a waveform of information (c) written in the memory 11 (FIG. 1). Item (e) of FIG. 3 shows read clock pulses which are generated in the clock source 12 (FIG. 1) for reading out the stored information (b) and (d) having phases different from each other and the same rise time of said read clock pulses. In FIG. 3, only two inputs 1 and 2 are explained; however, it is understood that $n$ inputs actually exist with respect to the $n$ system. In FIG. 1, as the memory 11 (FIG. 1) is used, "$n$" pieces of PCM information having different phases can be received by the sending terminal.

Figure 4:
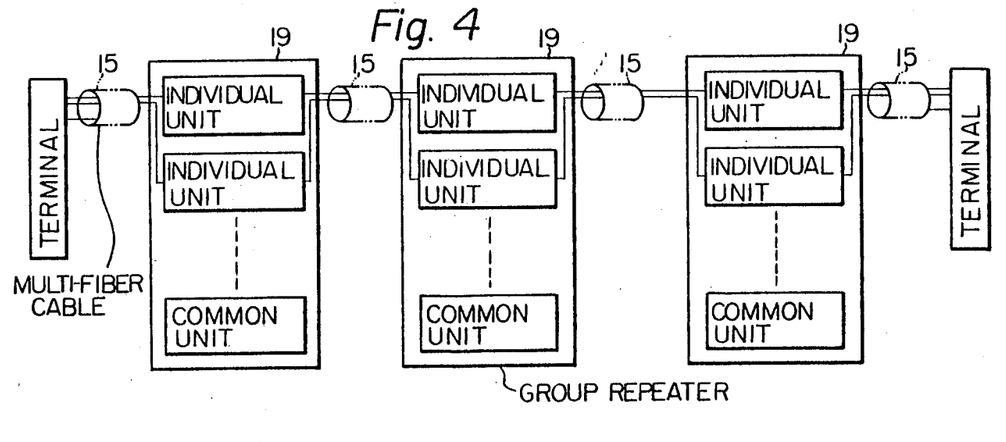
FIG. 4 is a block diagram of the optical PCM group transmission system.

Output information from the sending terminal shown in FIG. 1 is sent via the light cable 15 (FIG. 2) to group repeater 19 shown in FIG. 4. As shown in FIG. 4, the group repeater 19 is composed of individual units and a common unit. This group repeater amplifies and reproduces attenuated signals which are received via the light cable, and thereafter sends the reproduced and amplified signals to the next light cable. Usually such a group repeater is provided, for example, in a manhole. A basic principle of the group repeater is to commonly hold the circuits for as many $n$ systems as possible so that the light repeater can be realized in a miniature size for use with low power and for manufacturing with a low cost.

Figure 5:
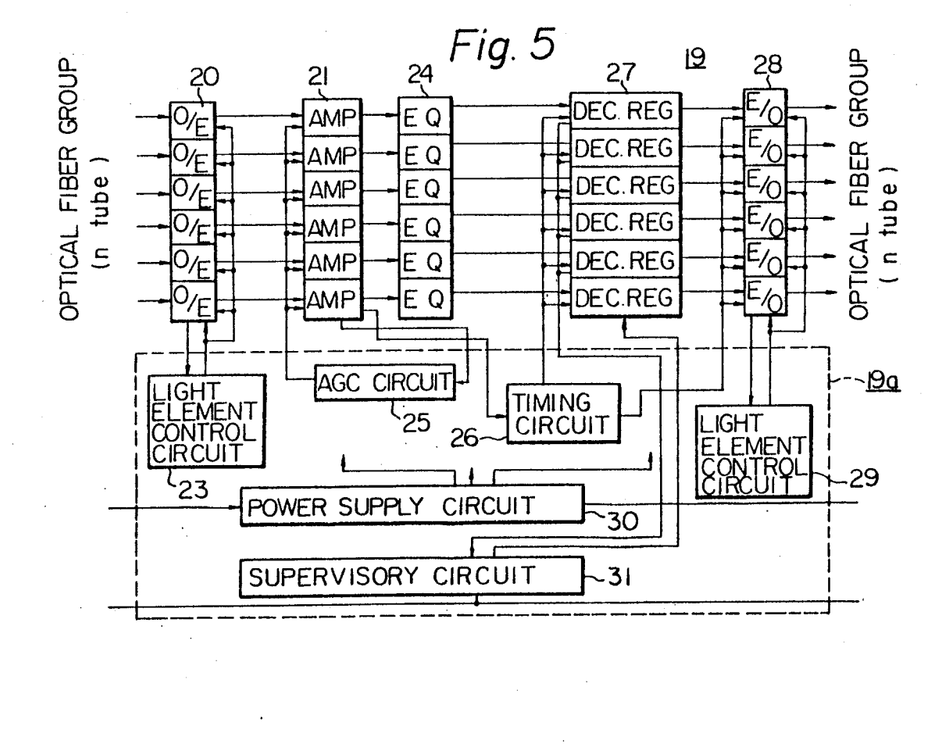
FIG. 5 is a block diagram of a group repeater according to the present invention.

One example of the block diagram of the group repeater 19 is shown in FIG. 5. The PCM information transmitted via the optical fiber group cable 15 is converted by an opto-electric converter 20 to electric signals, and the electric signals are then amplified by an amplifier 21. Two light element control circuits 23 and 29 are used for compensating the temperature characteristics of an avalanche photo diode used in the opto-electric converter 20 and of a laser used in the electro-optic converter 28, respectively. The outputs of the amplifier 21 are supplied via an equalizer array 24 to a discrimination and regeneration circuit array 27. An AGC circuit 25 is connected between the output and the input of the amplifier 21. However, it is understood that the AGC circuit 25 effect can be also realized by changing the multiplication factor of the avalanche photo diode in the opto-electric converter 20. A timing circuit 26 receives the output of the amplifier 21 and controls the timing of the discrimination of the discrimination and regeneration circuit 27 and the electro-optic converter 28. The output of said circuit 27 is again sent out via the electro-optic converter 28 to the next optical fiber group cable 15 (FIG. 2). And the timing circuit 26 shown in FIG. 5 utilizes self-timing using the output of the amplifier 21; however, the timing circuit 26 can also utilize external timing.

Referring to FIG. 5, the group repeater 19 has a common circuit 19a which can be used for processing a plurality of input signals, included therein are two light element control circuits 23, 29, an AGC circuit 25, a timing circuit 26, a power supply circuit 30, and a supervisory circuit 31. With regard to the timing circuit 26 shown in FIG. 5, it is understood that timing information can be obtained from the PCM information signal or from one optical cable which is specially provided for transmitting a series of timing clock pulses. The timing pulses generated by the timing circuit 26 are supplied to operate the discrimination and regeneration circuit array 27 so as to send out the PCM information to the next $n$ tube optical fiber group cable with the same phase.

Figure 6A:
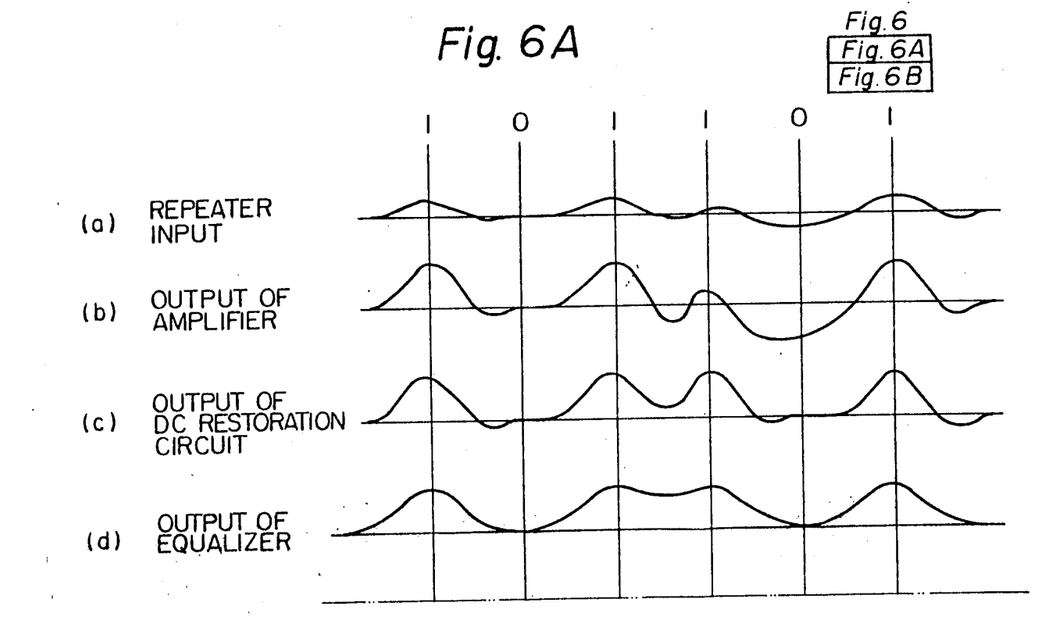
Figure 6B:
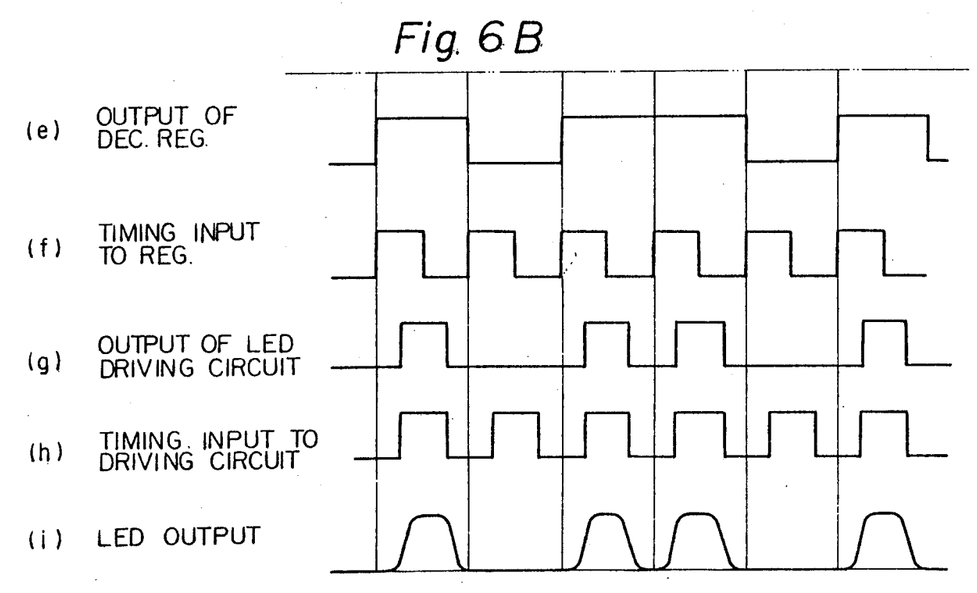

Waveforms of signals which appear in the essential parts of the circuit shown in FIG. 5 are shown in FIG. 6. In the waveforms shown in FIG. 6, a delay time appearing in every circuit is neglected. Waveform (a) of FIG. 6 is an input signal of the repeater, and the amplitude of said input signal is usually very small. Waveform (b) of FIG. 6 is an amplified output, and the DC component of this output is reproduced as shown in (c) of FIG. 6 by the main amplifier 21 which has a function of DC restoration. The signal as shown in (c) of FIG. 6 is supplied to the equalizer 24. The output of said equalizer 24 is shown in (d) of FIG. 6. The output of the equalizer 24 is supplied to the discrimination and regeneration circuit 27; the output of which is shown in (e) of FIG. 6. Waveform (f) of FIG. 6 is a timing input which is supplied from the timing circuit 26 to the discrimination and regeneration circuit 27. The output (e) of the discrimination and regeneration circuit 27 is applied to the electro-optic conversion circuit 28, wherein a driving output (g) of FIG. 6 for driving either a light emission diode or a laser diode is obtained by using the timing of the timing pulses (h) of FIG. 6. Waveform (i) is the light output from either the LED or the LD which is sent to the next optical fiber cable.

Figure 7:
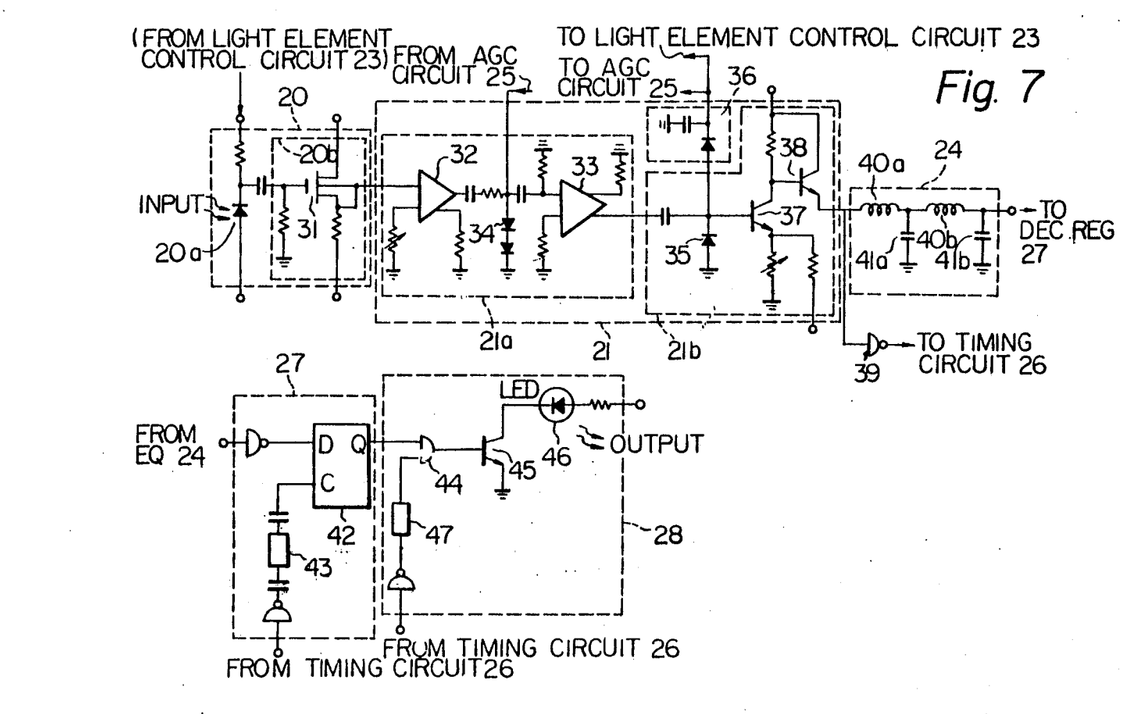
FIG. 7 is a one example of an individual unit in the group repeater shown in FIG. 5.

One example of detailed individual circuits which may be used in the group repeater of FIG. 5 is shown in FIG. 7. The opto-electric element 20 has a pin diode 20a and a pre-amplifier 20b which includes a field effect transistor 31. The output of the photo-electric element 20 is applied to the main amplifier 21. The main amplifier 21 is composed of an amplifier 21a and a clamp and peak detector 21b. The amplifier 21a includes integrated operational amplifiers 32, 33 and diode 34, the flat gain of which is controlled by the output of the AGC circuit 25. The output of the amplifier 21a is supplied to the clamp and peak detector 21b, wherein the output is clamped by a diode 35 and is also applied via a peak detector 36 to the AGC circuit 25 and to the light element control circuit 23. The output of the clamp and peak detector 21b is also applied to the equalizer 24 and is supplied via a gate 39 to the timing circuit 26. The equalizer 24 is composed of inductances 40a, 40b and capacitances 41a, 41b. The discrimination of regeneration circuit 27 is chiefly composed of a flip-flop 42. The output of the equalizer 24 is supplied to said flip-flop 42, and also the output of the timing circuit 26 is applied via a delay line 43 to the flip-flop 42. The output of the discrimination and regeneration circuit 27 is supplied to the electro-optic converter circuit 28. The electro-optic converter circuit 28 includes an AND circuit 44, a driver circuit 45 and a light emission diode element 46. The output of the discrimination and regeneration circuit 27 is supplied to a first input terminal of the AND circuit 45. The output of the timing circuit 26 is supplied via another delay line 47 to a second input terminal of the AND circuit 44. The output of the driver circuit 45 has the waveform shown in (g) of FIG. 6 which drives the light emission diode 46. The output of the light emission diode 46, which has the waveform shown in (i) of FIG. 6, is sent out to the next optical fiber cable.

Figure 8A:
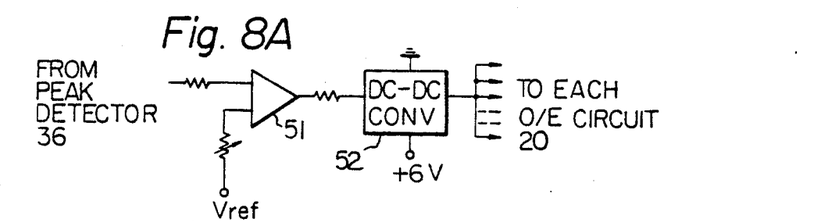
FIGS. 8A through 8D are examples of a common unit in the group repeater shown in FIG. 5.
Figure 8B:
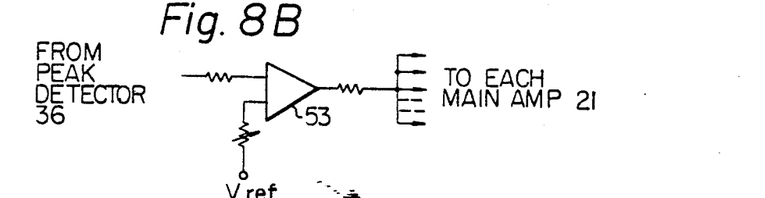
Figure 8C:
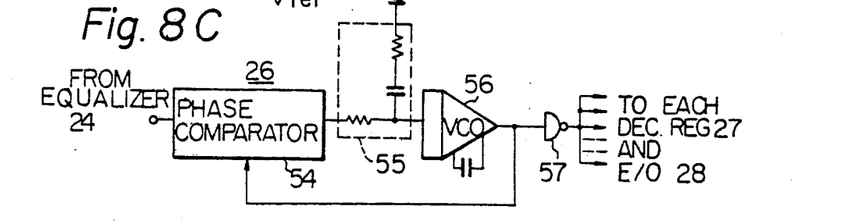
Figure 8D:
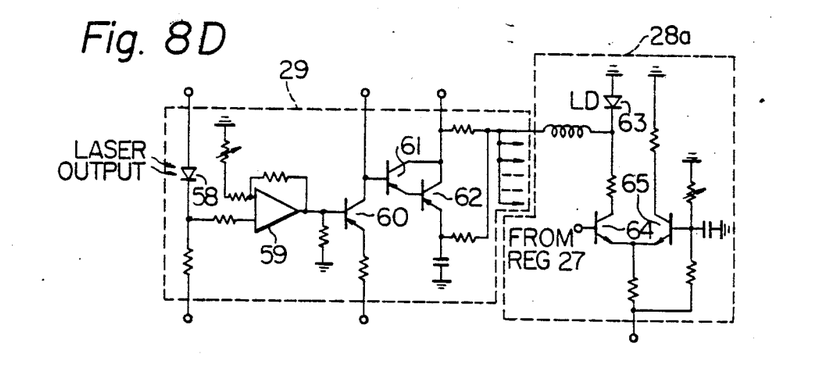

One example of the circuit content of the common unit 19a used in the group repeater 19 is shown in FIGS. 8A through 8D. FIG. 8A is one example of the light element control circuit 23. This control circuit 23 can be omitted when a pin diode (like 20a in FIG. 7) is used as the opto-electric conversion element. However, when an avalanche photo diode is used as the photoelectric conversion element, the breakdown voltage of this element varies due to the variation of temperature; therefore, the bias voltage of such an element should be controlled as to maintain the amplitude of the output waveform at a constant value. The circuit 23 is composed of an operational amplifier 51 and a DC-DC converter 52. The operational amplifier 51 receives a peak output from the peak detector 36 (FIG. 7) and compares said peak output with a reference voltage Vref. The difference output of the amplifier 51 is used for operating the DC-DC converter 52, the outputs of which are supplied to each opto-electric conversion circuit 20. FIG. 8B shows the AGC circuit 25 of FIG. 5 which includes another operational amplifier 53. The operational amplifier 53 receives the output of the peak detector 36 (FIG. 7) and compares said output with a reference voltage Vref. The outputs of the operational amplifier 53 is supplied to the diode 34 of the main amplifier 21, so that the flat gain of main amplifier 21 is controlled by the diode 34 shown in FIG. 7. FIG. 8C shows the timing circut 26 of FIG. 5 which is composed of a phase comparator 54, a filter 55, and a voltage controlled oscillator 56, one output of which is fed back to the phase comparator 54. The output of the voltage controlled oscillator 56 is supplied via a gate 57 to each discrimination and regeneration circuit 27 and to each electro-optic circuit 28. The phase comparator 54 in the timing circuit 26 compares the phase of the input signal from the equalizer 24 with that of the feedback signal from the output of the voltage controlled oscillator 56, and the output of the phase comparator 54 is then applied to the voltage control oscillator 56. The oscillator 56 generates clock pulses which are synchronized with the output of the equalizer 24 and the clock pulses are sent to the circuits 27 and 28. FIG. 8D shows a light element control circuit 29 (FIG. 5) which can be omitted when the light emission diode 46 shown in FIG. 7 is used; however, said light element control circuit 29 cannot be omitted when a laser diode 63 is used. This is due to the same reason explained hereinbefore with respect to FIG. 8A. Referring to FIG. 8D, a pin diode 58 detects the light emission of the laser diode, and then the output of the pin diode 58 is compared with a reference value. The difference between said two values is amplified by operational amplifier 59, transistors 60, 61 and 62, and supplied to the electro-optic circuit 28a where the laser diode 63 is driven by transistors 64 and 65 which differ from driver 45 in FIG. 7.

Next is an explanation of the supervisory circuit 31. As already explained, the diameter of the optical fiber is very small, a cable which includes a group of the optical fibers can be utilized and a group repeater is provided per one entire cable. Therefore, when one small optical fiber malfunctions, it is very difficult to find out the exact location where the damage occurred. According to the present invention, the malfunction point can be discriminated by the terminal.

In the repeating system shown in FIG. 4, at least one optical fiber among the group of optical fibers is used for transmitting a redundant bit, so that the transmission error can be checked by said redundant bit. An error detecting pulse is supplied, via a conductor which is added to the group of optical fibers, to the terminal where the malfunction point is discriminated by the error detecting pulse which has a different pulse width, in accordance with the various group repeaters.

Figure 9A:
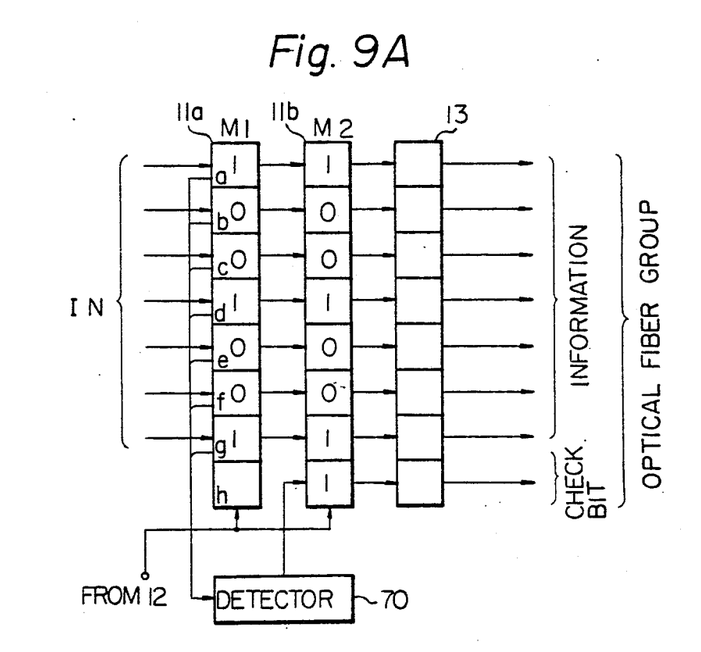
FIG. 9A shows a block diagram of the sending terminal which sends a check bit.
Figure 9B:
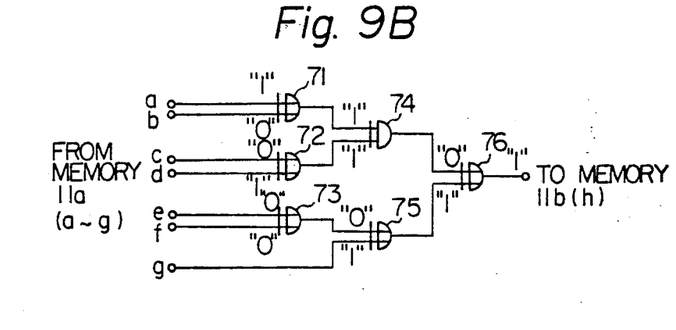
FIG. 9B shows a block diagram of a detector circuit shown in FIG. 9A.

In the sending terminal as shown in FIG. 9A, memory ($M_1$) 11a has regions corresponding to the information, and memory ($M_2$) 11b has said information regions as well as the region corresponding to the check bit. The information output of memory 11b is sent via the electro-optic conversion circuit 13 to (n-1) tubes of the optical fiber group 15 while the check bit of memory 11b is sent via the electro-optic conversion circuit to the remaining one tube of the optical fiber group 15. A detector circuit 70 is composed of, as shown in FIG. 9B, exclusive OR circuits 71 through 76. This circuit counts each binary value "1" or "0" of the content of the memory 11a and writes a binary value "1" or in "0" in the region of the check bit of the memory by means similar to the means commonly used for a parity check.

When seven channels of PCM information are transmitted in series, each bit of information is first stored in the memory ($M_1$) 11a. If seven channels of information are 1001001 at a certain time as shown in FIG. 9A, the number of the value "1" in the content of the memory 11a is an odd number. Therefore, the detector circuit 70 writes the value "1" in the check bit region of the memory 11b so as to make the number of the value "1" in the memory 11b an even number. It may be also possible for the detector circuit 70 to write the value "0" in the check bit region so as to make the number of the value "1" in the memory 11b an odd number. The electro-optic converter 13 is driven according to the content of the memory 11b, and light signals are sent out as parallel signals to the optical fiber group.

Figure 10A:
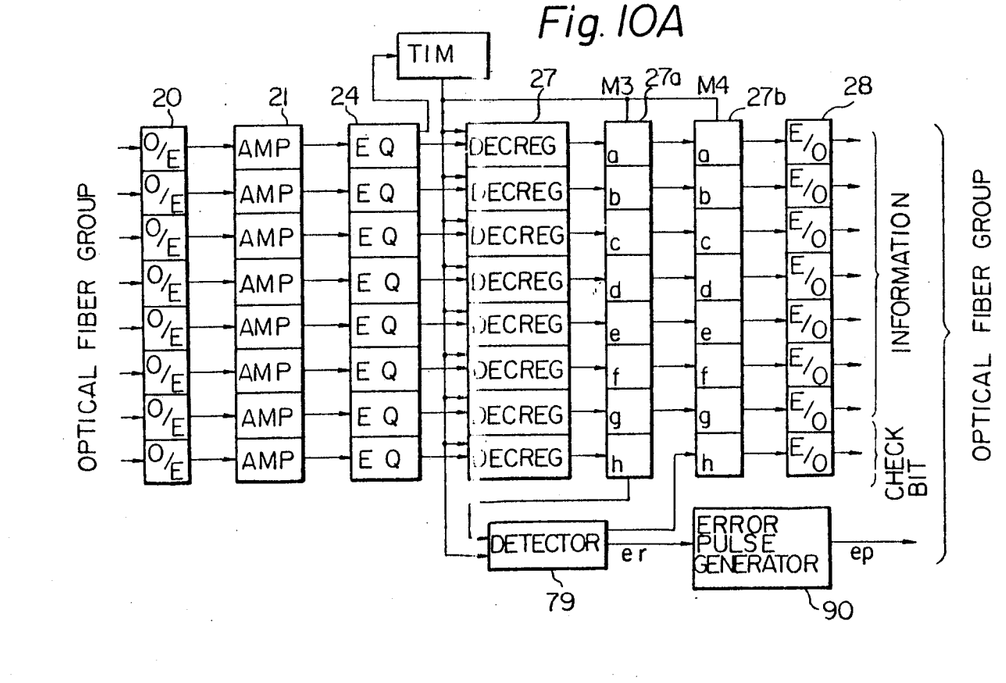
FIG. 10A shows a block diagram of the group repeater including the supervisory circuit shown in FIG. 5.

The PCM information signals and the check bit signal are converted to electric signals by the opto-electric conversion circuit 20 as shown in FIG. 10A. The converted electric signals are supplied via the amplifier 21 and the equalizer 24 to the discrimination and regeneration circuit 27 and are stored in memory ($M_3$) 27a as a binary value "1" or "0". The number of "1"'s in the memory 27a is counted by the detector 79 which is composed of exclusive OR circuits 80 through 87 and inverters 88, 89 as shown in FIG. 10F. If the total number of the values "1" in the formation bits and the check bit is selected as an even number as shown in FIG. 9A, the value counted by the detector circuit 79 should also be an even number. Therefore, if the counted value is an even number, the content of memory 27a is set to the memory 27b, and the content of memory 27b is, via the electro-optic conversion circuit 28, converted into a light signal which is sent to the next group repeater.

If the value counted by the detector circuit 79 is an odd number, then, it means that any one of the optical fibers may have malfunctioned. The detector circuit 79 then supplies an error detecting signal er to an error pulse generator circuit 90 which supplies an error pulse ep having a pulse width as assigned to the group repeater for the particular terminal. Also, the detector circuit 79 rewrites the clock bit region of the memory 27b so as to make the number of the value "1" in the content of the memory 27b an even number. If the content of the memory 27b is sent to the next group repeater without rewriting the check bit region, it is judged that the error has occurred in the next group repeater.

Figure 10B:
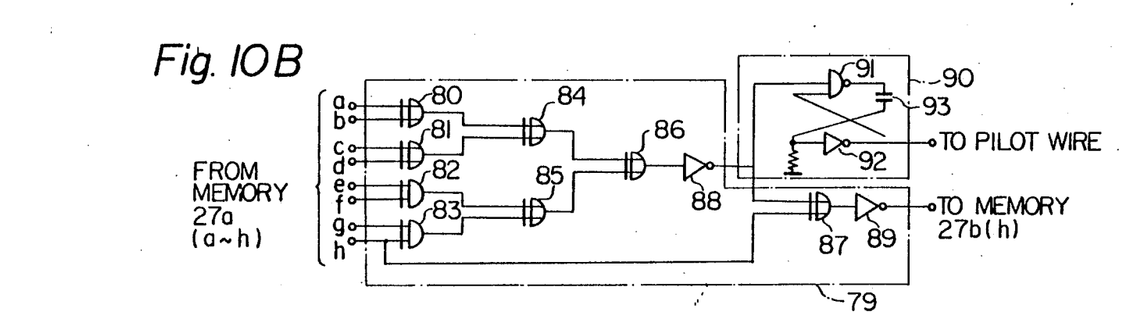
FIG. 10B is a block diagram including a detector and an error pulse generator shown in FIG. 10A.

The error pulse generator circuit 90 shown in FIG. 10B is composed of a mono-stable multivibrator including a NOR circuit 91, an inverter 92 and a time constant capacitor 93. The mono-stable multivibrator is triggered by the error detecting signal er. The time constant defined by the capacitor 93 of every group repeater is selected with a different value in every group repeater. It may be also possible for the error pulse generator 90 to generate a plurality of pulses, the period of said pulses can be selected with a different value in every group repeater.

Figure 11A:
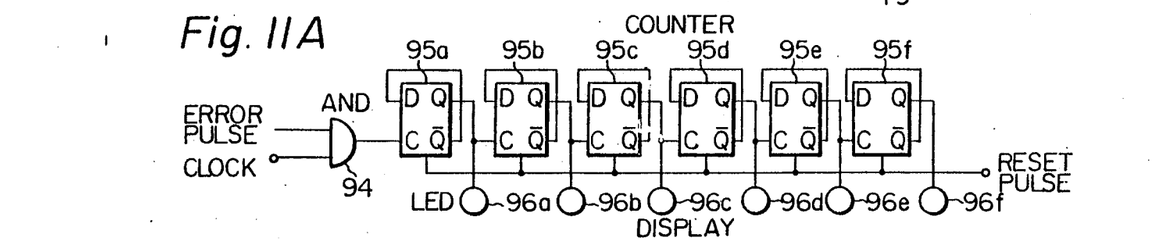
FIG. 11A is a block diagram of a display circuit which is provided in terminal and indicates a repeater which has an error.
Figure 11B:
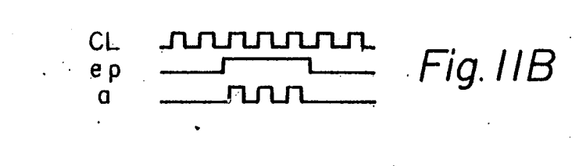
FIG. 11B shows waveforms of the signals which are created in the display circuit shown in FIG. 11A.

In the terminal, as shown in FIG. 11A, clock pulses CL and the error detecting pulses ep (FIG. 11B) are supplied to an AND circuit 94. The output of said AND circuit 94 is supplied to a counter 95 consisting of flip-flops 95a to 95f corresponding to the width of the pulse width of the error pulses ep are counted. A display 96 consisting of LEDs 96a to 96f indicate the condition of the group repeater when an error occurs in accordance with the content of the counter 95. Therefore, the group repeater where an error has occurred can be immediately discriminated by the terminal, FIG. 11B shows the waveforms of the clock pulses CL, the error pulses and the counted output a of the circuit shown in FIG. 11A.

What is claimed is:

1. A light PCM group transmission repeating system for transmitting PCM information by means of a plurality of optical fiber groups each of which is composed of a plurality of optical fibers comprising: group repeaters provided for each optical fiber group, each group repeater having a plurality of individual means for regenerating the PCM information as transmitted through a plurality of said optical fibers, each group repeater having additional means commonly connected to said individual means for simultaneous control thereof;

each of said individual means for each group repeater including an individual opto-electric converter circuit, an amplifier, an equalizer and an electro-optic converter circuit for each of a plurality of said optical fibers, and said commonly connected additional means for simultaneous control of said individual means including at least one of the following circuits, an automatic gain control circuit, a light element control circuit, a power supply circuit, a timing circuit, and a supervisory circuit.

2. A light PCM group transmission repeating system according to claim 1, wherein said PCM information to be sent to said optical fiber group is stored in a memory which is provided in a sending terminal, said PCM information which is stored in said memory is read out with simultaneous clock pulses for sending said PCM information to said optical fiber group.

3. A light PCM group transmission repeating system according to claim 1, wherein said opto-electric conversion circuit includes a pin diode as an opto-electric conversion element.

4. A light PCM group transmission repeating system according to claim 1, wherein said amplifier includes a diode element for controlling and maintaining the output of said amplifier at a constant level.

5. A light PCM group transmission system according to claim 1, wherein said equalizer is composed of inductive elements and capacitive elements.

6. A light PCM group transmission repeating system according to claim 1, wherein each individual means of each group repeater also includes a discrimination and regeneration circuit composed of a flip-flop circuit, wherein the output of said equalizer is applied to a first input of said flip-flop circuit; the output of said timing circuit is applied to a second input of said flip-flop circuit and; the regenerated output of said discrimination and regeneration circuit is supplied to said electro-optic conversion circuit.

7. A light PCM group transmission repeating system according to claim 1, wherein said electro-optic conversion circuit is composed of a flip-flop circuit and a light emission diode element, said flip-flop circuit receives the output of said discrimination and regeneration circuit at its first input and receives another output of said timing circuit at its second input, and the output of said flip-flop circuit drives said light emission diode.

8. A light PCM group transmission repeating system according to claim 1, wherein said opto-electric conversion circuit includes an avalanche photo diode element as an opto-electric conversion element, said light element control circuit is composed of an operational amplifier which receives the peak output of said amplifier and compares said peak output with a reference voltage, and a DC-DC converter which converts the output of said operational amplifier so as to control the bias voltage of said avalanche photo diode.

9. A light PCM group transmission repeating system according to claim 1, wherein said AGC circuit receives the peak output of said amplifier, compares said peak output with a reference voltage, and wherein the difference output of said AGC circuit controls a bias current of a diode element of said amplifier.

10. A light PCM group transmission repeating system according to claim 1, wherein said timing circuit is composed of a phase comparator and a voltage controlled oscillator, said phase comparator compares the output phase of said equalizer with the output phase of said voltage controlled oscillator and the output of said phase comparator supplies a series of timing pulses having a constant phase to a discrimination and regeneration circuit and said electro-optic conversion element.

11. A light PCM group transmission repeating system according to claim 1, wherein said electro-optic conversion circuit is composed of a drive circuit which is driven by the output of a discrimination and regeneration circuit and a laser diode, said light element control circuit is composed of a pin diode which converts the optical output of said laser diode to an electric signal and an operational amplifier which compares the output of said pin diode with a reference voltage so that the difference output of said operational amplifier controls the bias current of said laser diode.

12. A light PCM group transmission repeating system according to claim 2, wherein at least one optical fiber of said optical fiber group is used for transmitting a check bit information, said sending terminal counts the number of the digital values "1" or "0" and adds a check bit so that the number of said digital values "1" or "0" becomes an odd or an even number, and if said supervisory circuit detects an error in said group repeater, said supervisory circuit generates an error pulse corresponding to said group repeater where the error is detected and sends said error pulse to said sending terminal, so that said sending terminal discriminates the group repeater where the error occurred.

* * * * *

UNITED STATES PATENT AND TRADEMARK OFFICE
CERTIFICATE OF CORRECTION

PATENT NO. : 4,074,127

DATED : February 14, 1978

INVENTOR(S) : Yukou Mochida et al

It is certified that error appears in the above-identified patent and that said Letters Patent are hereby corrected as shown below:

```
In the Abstract, line 6, "system" should be -- memory --;
Column 2, line 63, delete "detail";
Column 2, line 64, after "in" insert -- detail --;
Column 4, line 19, "Waveform(f)" should be -- Waveform (f) --;
Column 4, line 47, "of" should be -- and --;
Column 4, line 48, after "27" insert -- of Fig. 7 --;
Column 5, line 54, after "explained" insert -- since --;
Column 6, line 16, after "means" insert -- commonly --;
Column 6, line 17, delete "commonly";
Column 7, line 12, after "95f" insert -- where the clock pulses --.
```

Signed and Sealed this

Fifteenth Day of August 1978

[SEAL]

Attest:

RUTH C. MASON
Attesting Officer

DONALD W. BANNER
Commissioner of Patents and Trademarks